No. 668,012. Patented Feb. 12, 1901.
N. C. LOCKE.
GLOBE OR OTHER VALVE.
(Application filed May 22, 1900.)
(No Model.)

WITNESSES:
Francis E. Phillips
Ethel B. Spencer

INVENTOR:
Nathaniel C. Locke

UNITED STATES PATENT OFFICE.

NATHANIEL C. LOCKE, OF SALEM, MASSACHUSETTS.

GLOBE OR OTHER VALVE.

SPECIFICATION forming part of Letters Patent No. 668,012, dated February 12, 1901.

Application filed May 22, 1900. Serial No. 17,564. (No model.)

*To all whom it may concern:*

Be it known that I, NATHANIEL CHASE LOCKE, a citizen of the United States, and a resident of the city of Salem, county of Essex, and State of Massachusetts, have invented new and useful Improvements in Globe or other Valves, of which the following is a specification.

My invention relates to that class of valves in which one of the seats is composed of a material softer and more yielding than that of which the opposite seat is composed.

The objects of my invention are, first, to provide a perfectly-tight valve when closed, and, second, to prevent the soft packing composing one of its seats from wasting away with constant use. I attain these objects by the mechanism illustrated in the accompanying drawings, which represent a valve embodying my improvements.

By reference to my patent numbered 256,109, dated April 4, 1882, it will be observed that the valve-disk contains a soft-metal filling, which when the valve is closed comes in contact with the raised seat in the body of the valve having a rounded upper surface made in the form of a bead. This form of valve-seat was found objectionable, as it rapidly wore its way into the soft metal, forcing it away upon either side. This defect is remedied in the form of valve herein shown and described.

Figure 1:
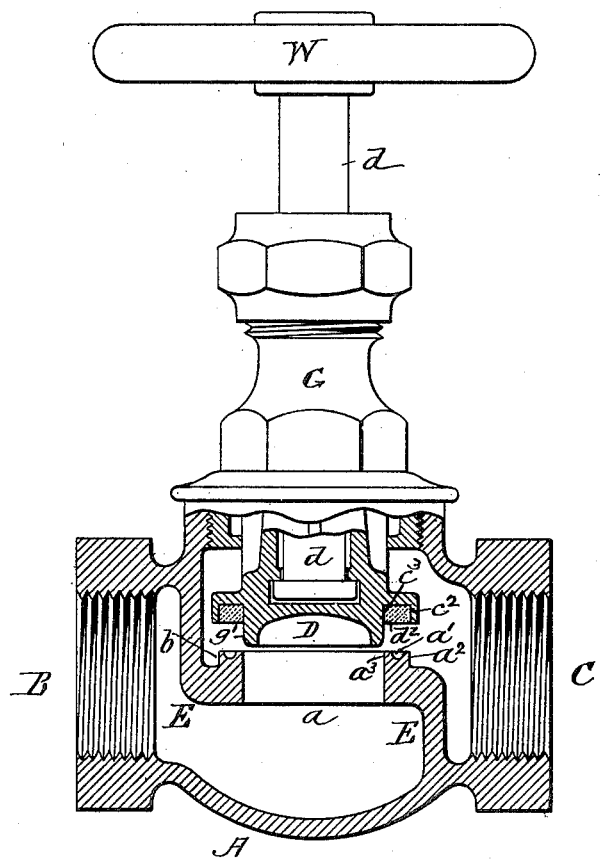
Figure 2:
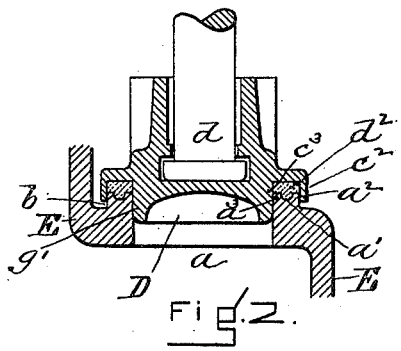

In the accompanying drawings, Figure 1 is a vertical section of the valve. Fig. 2 is a section of the valve-disk, showing the changed condition of the soft-metal seat.

In Fig. 1, A is the valve-casing.

B is the inlet, and C the outlet.

$a$ is the valve-opening through partition E E, which divides the cavity of casing A into two chambers.

$b$ is the raised portion around opening $a$, forming the valve-seat, which has the circular groove or depression $a'$, and thereby dividing the surface of the valve-seat into two parts $a^2$ and $a^3$.

D is the valve-disk, containing the soft packing, which may be of a soft metallic alloy or any other suitable substance.

$d$ is the spindle of the valve, to which disk D is attached in the usual manner, so that it may adjust itself to the valve-seat in closing. Extending from the valve-disk the central portion $g'$ is made to operate as a guide to the valve in closing and to protect the seats of the valve from the cutting action of the fluid when passing through the valve.

The operation is as follows: The valve is placed in a line of pipe through which fluid is passing and closed to its seat by use of wheel W. The soft packing is thus brought into contact with the valve-seat. The raised portions $a^2$ and $a^3$ will come into contact with the packing near the outer and inner walls $c^2$ and $c^3$, respectively.

It will be seen that this is a double-seated valve, in which the fluid must pass both points of contact before it can escape through the valve.

Constantly closing this valve has a tendency to make an impression into the soft metal, throwing the displaced metal toward the center, where it is caught and held by the circular groove between the valve-seats until this is entirely filled, which forms a continuous point of contact from one seat to the other; but as the metal can no longer be displaced it remains in this condition indefinitely.

What I claim, and desire to secure by Letters Patent, is—

A valve of the kind described, comprising a casing having a partition within it with a valve-opening through the partition, a raised portion around the valve-opening, said raised portion having in its face a groove which divides the said raised part into two seats, and a valve-disk to fit the seat and close the valve-opening, said disk having a central guide, an annularly-recessed seating portion, the outer and inner walls of which seating portion fit over the valve-seat, and a soft metal in said recessed portion, this metal being adapted to fit upon the valve-seat and fill the groove thereof.

In testimony whereof I affix my signature in presence of two witnesses.

NATHANIEL C. LOCKE.

Witnesses:
 FRANK E. LOCKE,
 LILLIE V. HARDING.